3,462,294
COATING
Manuel A. Thomas, Spartanburg, S.C., assignor to Deering Milliken Research Corporation, Spartanburg, S.C., a corporation of South Carolina
Continuation-in-part of application Ser. No. 430,252, Feb. 4, 1965. This application Feb. 29, 1968, Ser. No. 711,162
Int. Cl. B44d 1/00
U.S. Cl. 117—121                                          9 Claims

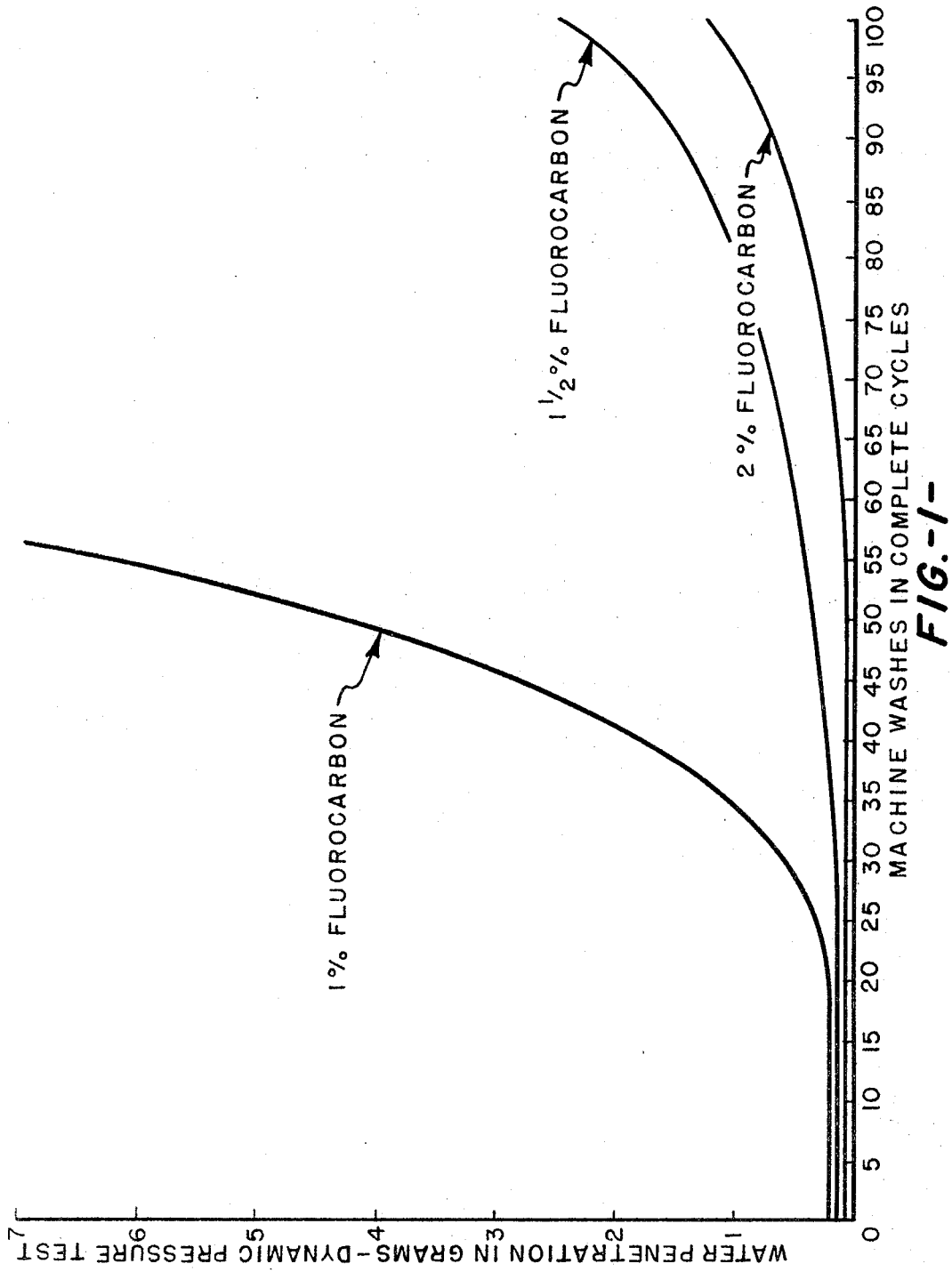

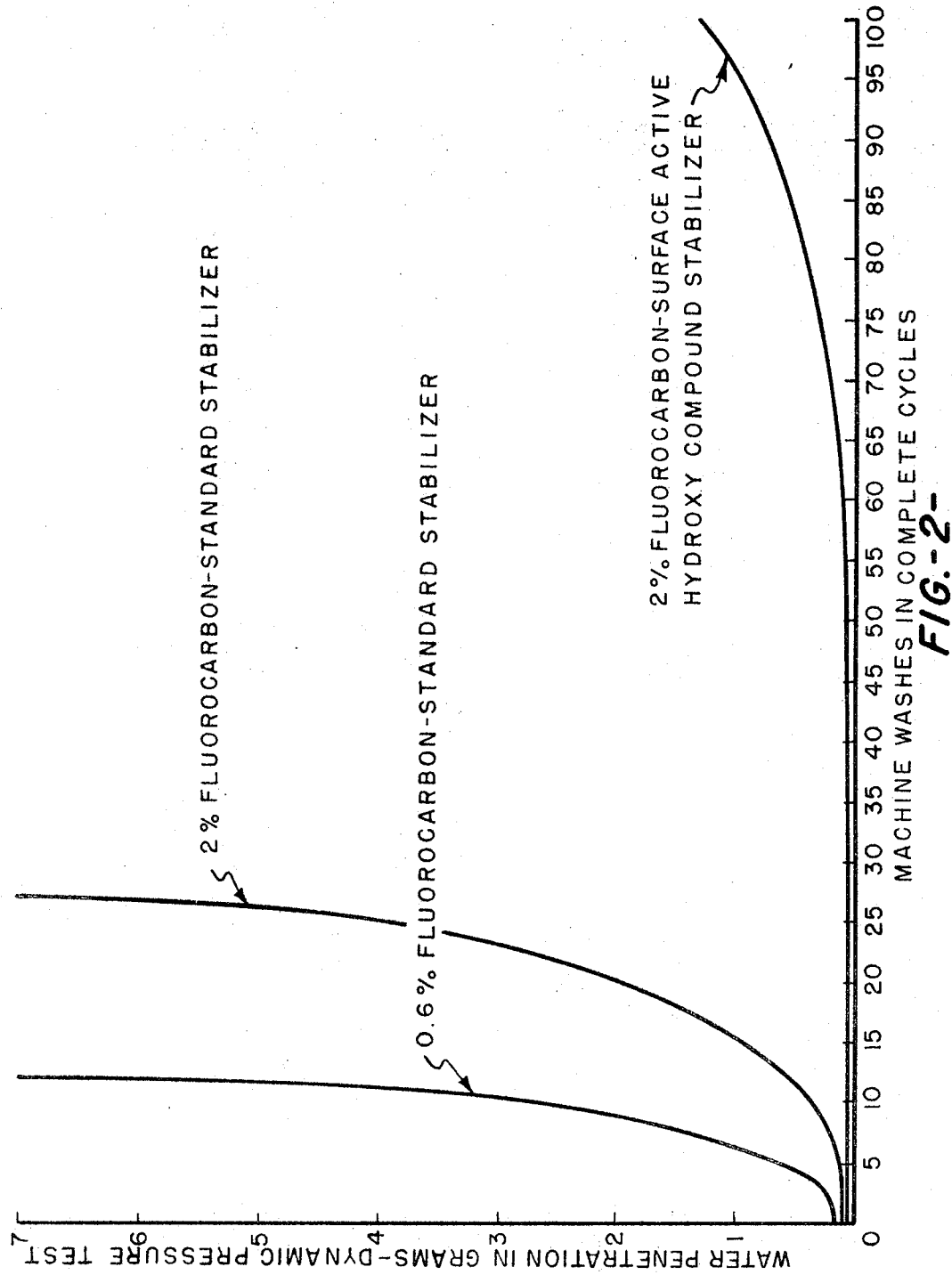

ABSTRACT OF THE DISCLOSURE

This invention relates to a fabric coated with a fluorochemical having the ability to impart water and oil repellent properties to textile materials, wherein the fluorochemical system is stabilized against shear breakdown through the use of a water soluble, acid stable, alkyl ether of diethylene glycol. The durability of the water and oil repellency of the textile materials treated in this manner is greatly improved.

---

This application is a continuation in part of application Ser. No. 430,252, filed Feb. 4, 1965, now abandoned.

This invention relates to stabilized water repellent compositions and more specifically to stabilized fluorocarbon water repellent compositions.

Fluorocarbon chemicals have recently gained wide acceptance as coating materials for imparting water and oil repellency to textiles, paper and leather. Fluorocarbon chemicals have been found to be especially suitable for cotton finishing in that cotton fabrics treated with fluorocarbon chemicals, so as to produce oil and water repellency, are found to be extremely durable to both laundering and dry cleaning. Coating compositions employing fluorocarbon chemicals must, however, be stabilized against shear breakdown by the incorporation of emulsifiers which have a tendency to reduce the durability of the water repellent fluorocarbon chemical to dry cleaning and washing. For purposes of this invention, the term shear breakdown may be defined as that phenomenon which causes a particulate material to be thrown out of suspension through the formation of conglomerates produced by mechanical compacting forces. When the fluorocarbon chemical coating composition which had been stabilized against shear breakdown is to be applied to the specific substrate the problem of stabilization is further complicated by the fact that the stabilizer must not have an affinity for the substrate, that is to say, the stabilizer must be readily removable subsequent to completion of the coating operations. It is also important that the stabilizing medium for the fluorocarbon chemical be a non-reactive component, that is to say, a component which will not react with the fluorocarbon chemical so as to increase the solubility of the fluorocarbon chemical and correspondingly reduce the durability of the fluorocarbon chemical to laundering or dry cleaning operations.

It is therefore an object of this invention to provide a fluorocarbon water repellent composition which is stabilized against shear breakdown.

It is another object of this invention to provide a fluorocarbon water repellent composition which is stabilized against shear breakdown with undiminished water repellent durability.

It is an additional object of this invention to provide a fluorocarbon water repellent composition of enhanced durability.

It is still another object of this invention to provide a fluorocarbon water repellent composition which is stabilized against shear breakdown by means of a stabilizing agent which is suitable for easy removal from the coated product.

In accordance with this invention, it has now been discovered that a fluorocarbon water repellent composition may be stabilized against shear breakdown in an improved manner by the addition of at least one water soluble acid stable surface tension reducing hydroxy compound which is non-reactive with fluorocarbon chemicals. More specifically the stabilizing agents which are contemplated for use in this invention are alkyl ethers of diethylene glycol.

The fluorocarbon compounds with which this invention is concerned are fluorocarbon compounds which have the ability to impart water and oil repellent properties to textile materials. These compounds may be defined as reactive organic compounds in which a high percentage of the hydrogen attached to carbon has been replaced by fluorine. Fluorocarbon compounds which have particular utility in this field are acrylates and methacrylates of hydroxyl compounds containing a highly fluorinated residue and their polymers and copolymers. Fluorocarbon compounds of this type are defined with greater particularity in U.S. Patents 2,642,416; 2,826,564; 2,839,513; and 2,803,615. Other fluorochemical compounds which can be employed as oil-and-water repellents include the chromium coordination complexes of saturated perfluoromonocarboxylic acids of which the chromium complexes of perfluorobutyric acid and perfluorooctanoic acid are representative. Fluorochemical compounds suitable for the process of this invention are available commercially, such as for example, those marketed under the trade name of "Zepel" by E. I. du Pont de Nemours and Company and those marketed under the trade name of "Scotchgard" by the Minnesota Mining and Manufacturing Company.

The exact mechanism by which fluorocarbon chemical emulsions and suspensions are broken is unknown. It is known that it is difficult to keep large particles in suspension in liquids because of their greater tendency to settle and therefore it is assumed that in mechanically forcing fluorocarbon particles into intimate contact with each other that large conglomerates are produced which cause the fluorocarbon to be thrown out of the carrying medium. This phenomenon is commonly known as shear breakdown and is most noticeable when coating compositions of fluorocarbon chemicals are subjected to rapid mixing prior to use in pad baths and is also noticeable when fluorocarbon chemical coating compositions are employed in pad baths themselves wherein heavy pressure between pad roll members will also cause intimate mechanical contact between fluorocarbon chemical particles and subsequent conglomeration. It is believed that the intimate mechanical contacting of the fluorocarbon chemical particles is prevented to a great extent, by the stabilizing component of this invention, by the ability of the stabilizing component of this invention to reduce surface tension and thereby allow the aqueous carrying medium to surround the individual fluorocarbon chemical particles in an improved manner, thereby keeping them from coagulating in spite of mechanical compacting pressures.

In general, the coating compositions of this invention employ concentrations of fluorocarbon chemical in quantities such that a pickup of from about 0.2% by weight solids based on the dry weight of the fabric to about 5.0% by weight solids based on the dry weight of the fabric is obtained. A pickup in this range is achieved by preparing an aqueous coating composition containing from about 5% to about 15% by weight of fluorocarbon chemical and from about 0.2% by weight to about 8% by weight of stabilizing agent. It should be noted that when a high pickup of fluorocarbon chemical is desired, that is to say, when a pickup of about 2% solids based on the dry weight of the fabric is to be obtained, considerably higher quantities of stabilizing agents must be present in order to insure against shear breakdown. The presence of large quantities of prior art stabilizing agents can, however, result in significant changes in the durability of the fluorocarbon chemical coated fabric to laundering and dry cleaning operations. Where the stabilizing agents set forth in this invention are employed, high pickup coatings may be obtained without detrimentally affecting in any way the efficiency of the fluorocarbon chemical coating.

A better understanding of the invention may be had from the following example. It should be understood, however, that the example is given for purposes of illustration and should not be considered as limiting the spirit or scope of this invention.

EXAMPLE I

An aqueous coating composition is prepared as follows: 23% by weight Rhonite D12 (heterocyclic nitrogenous resins marketed by Rhom & Haas Chemical Company) 2.0% by weight Catalyst T10 (modified zinc nitrate catalyst marketed by Rohm & Haas Chemical Company) 10.2% by weight FC-208 (fluorocarbon marketed by Minnesota Mining and Manufacturing Company) 6% by weight of diethylene glycol monobutyl ether and 58.8% by weight water. The coating composition is then placed in a pad bath and a 100% cotton broadcloth (144 x 76-3.00) fabric is passed through the pad bath and squeezed at as low a pressure as is feasible in a manner such that a pickup of 2.0% by weight of solids based on the dry weight of the fabric is obtained. The fabric is then dried and cured at 340° F. for about 1½ minutes and the resultant product is found to pass the dynamic pressure test after 50 machine washes.

The dynamic pressure test which has previously been mentioned as being used to determine the ability of the coated fabric to resist the penetration of water is carried out substantially as follows:

A double thickness of the sample (10 inches x 13 inches) to be tested is placed on top of 2 layers of 8½ x 11 blotting paper (A²TC² standard paper) weighing approximately 47 grams. Superimposed on the test sample are 4 layers of heavy weight, 8½ x 11 diaper material. The weight of the 4 layers is approximately 30 grams. On top of the diaper material is poured, with a dropping funnel, approximately 110 grams of water at 30° C. to 35° C. The water is allowed to stand for approximately one minute, then a brass weight, cylindrical in shape, 5 inches in length and 2½ inches in diameter, and weighing approximately 8 lbs. is rolled (by hand or machine) back and forth approximately 90 complete traverses. After the period of rolling is over, the blotting paper is weighed to determine how much water has penetrated through the test sample.

It should be understood that the cellulosic fabrics treated with the coating composition of this invention may contain a higher pickup of fluorocarbon chemicals than any other cellulosic fabrics which have been heretofore known, that is to say, cellulosic fabrics which are prepared according to the methods of this invention may have durable coatings in excess of about 1% by weight of fluorocarbon chemical based on the dry weight of the fabric. The improvements to be obtained in the deposition of increased amounts of fluorocarbon chemicals will be readily apparent from a discussion of the drawings in which:

FIGURE 1 is a graph plotting water penetration against machine washes for fabric samples containing varying amounts of fluorocarbon.

FIGURE 2 is a graph plotting water penetration against machine washes for fabric samples containing prior art fluorocarbon compositions and the fluorocarbon composition of the present invention.

Turning to FIGURE 1 of the drawings, swatches of 3 yard per pound 144 of 76 cotton broadcloth fabric were treated with a coating composition made up as follows:

Sufficient amounts of FC-208 (fluorocarbon marketed by Minnesota Mining and Manufacturing Company) was added to portions of the coating composition defined in Example I as to result in 1%, 1½% and 2% by weight pickup, based on the dry weight of the fabric, on the test swatches. The swatches thus prepared were subjected to a plurality of machine washes in commercial detergent with water penetration being tested by means of the dynamic pressure test at the end of every five washes. As may be easily seen from FIGURE 1 of the drawings, fabric containing in excess of 1% by weight fluorocarbon has substantially increased water repellency after being subjected to repeated laundering operations.

The advantages in employing the stabilized fluorocarbon coating composition of this invention as opposed to the fluorocarbon coating compositions of the prior art are readily seen in FIGURE 2 of the drawings. The fabric swatches employed in obtaining the data for FIGURE 2 are 3 yards per pound 144 x 76 cotton broadcloth. The broadcloth fabric swatches were then coated with one of three coating compositions, the first of which is an aqueous dispersion of 3.5% by weight FC-208 fluorocarbon and 6.0% by weight of Argus DWR Special (melamine hydrophobe derived from melamine formaldehyde containing a hydrophobic group marketed by Argus Chemical Company). The second coating composition is an aqueous dispersion of 10.2% by weight FC-208 fluorocarbon and 10% Argus DWR Special. The third coating composition is the coating composition set forth in Example I containing a sufficient FC-208 to produce a pickup of 2% fluorocarbon based on the dry weight of the fabric. The swatches thus prepared were subjected to a plurality of machine washes in commercial detergent with water penetration being tested by means of the dynamic pressure test at the end of every five washes. As may be seen in FIGURE 2 of the drawings, the fluorocarbons which are stabilized with prior art compositions are not durable to laundering and increasing the pickup of fluorocarbon in the prior art stabilized coating compositions does not substantially improve laundering durability. In contradistinction to the prior art stabilized compositions, the fluorocarbon composition which is stabilized with the surface tension reducing hydroxy compound stabilizer of this invention shows remarkable durability to laundering.

That which is claimed is:

1. In a process for rendering a textile fabric water and oil repellent which comprises applying to said fabric an aqueous emulsion with between about 5% and 15% by weight of a fluorocarbon textile water repellent material and curing the treated fabric at an elevated temperature, the improvement comprising adding to said emulsion a water soluble, acid stable alkyl ether of diethylene glycol in an amount between about 0.2% and 8% by weight to stabilize said emulsion against shear breakdown.

2. The process of claim 1 wherein between about 0.2% and 5% by weight fluorocarbon solids are present on said fabric.

3. The process of claim 1 wherein the fluorocarbon is selected from the group consisting of fluoroacrylates, fluoromethacrylates and chromium coordination complexes of saturated perfluoromonocarboxylic acids.

4. The process of claim 1 wherein the alkyl ether of diethylene glycol is diethylene glycol monobutyl ether.

5. The process of claim 1 wherein the fabric undergoing treatment includes cotton.

6. A fabric prepared according to the process of claim 1.

7. A fabric prepared according to the process of claim 2.

8. A fabric prepared according to the process of claim 3.

9. A fabric prepared according to the process of claim 4.

References Cited

UNITED STATES PATENTS

| 2,937,156 | 5/1960 | Berry. | |
|---|---|---|---|
| 3,236,672 | 2/1966 | Shane et al. | 106—287 |
| 3,326,713 | 6/1967 | Smith et al. | 117—135.5 |

JULIUS FROME, Primary Examiner

L. HAYES, Assistant Examiner

U.S. Cl. X.R.

106—2, 287; 117—135.5, 139.5, 143